(12) United States Patent
Lee (10) Patent No.: US 8,136,132 B2
(45) Date of Patent: Mar. 13, 2012

(54) OPTICAL DISK DRIVE WITH ROTARY LOAD/EJECT MECHANISM AND RELATED COMPUTER DEVICE

(75) Inventor: Chih-Chiang Lee, Taipei Hsien (TW)

(73) Assignee: Wistron Corporation, Xizhi Dist., New Taipei (TW)

( * ) Notice: Subject to any disclaimer, the term of this patent is extended or adjusted under 35 U.S.C. 154(b) by 143 days.

(21) Appl. No.: 12/719,871

(22) Filed: Mar. 9, 2010

(65) Prior Publication Data

US 2010/0287577 A1    Nov. 11, 2010

(30) Foreign Application Priority Data

May 5, 2009  (TW) ............................... 98114794 A (51) Int. Cl.
*G11B 17/03* (2006.01)
(52) U.S. Cl. ......... 720/695; 720/612; 720/652; 720/653
(58) Field of Classification Search ............... 720/612, 720/652–653, 695
See application file for complete search history.

(56) References Cited

U.S. PATENT DOCUMENTS

| 6,091,573 | A  | * | 7/2000 | Pisano et al. | ............... | 720/630 |
| 6,208,506 | B1 | * | 3/2001 | Pao | ............... | 361/679.33 |
| 6,212,147 | B1 | * | 4/2001 | Ishihara | ............... | 720/612 |
| 7,663,999 | B2 |   | 2/2010 | Omori | | |
| 2008/0080083 | A1 | * | 4/2008 | Homer et al. | ............... | 360/51 |

FOREIGN PATENT DOCUMENTS

| CN | 2599708 Y | 1/2004 |
| CN | 1652247 A | 8/2005 |

OTHER PUBLICATIONS

Office action mailed on Apr. 25, 2011 for the China application No. 200910136371.1.

* cited by examiner

*Primary Examiner* — Daniell L Negron
*Assistant Examiner* — Carlos E Garcia
(74) *Attorney, Agent, or Firm* — Winston Hsu; Scott Margo (57) ABSTRACT

An optical disk drive includes a bracket, and a mecha module installed on the bracket. The mecha module includes a mounting plate fixed on the bracket, an optical pick-up head installed on the mounting plate in a slidable manner for reading or writing data in an optical disk, and a spindle motor installed on the mounting plate for rotating the optical disk. The optical disk drive further includes a rotary mechanism connected to the bracket and a base for driving the bracket to rotate into or out of an opening on a housing relative to the base.

14 Claims, 8 Drawing Sheets

OPTICAL DISK DRIVE WITH ROTARY LOAD/EJECT MECHANISM AND RELATED COMPUTER DEVICE

BACKGROUND OF THE INVENTION

1. Field of the Invention

The present invention relates to an optical disk drive and a related computer device, and more particularly, to an optical disk drive with a rotary load/eject mechanism and a related computer device.

2. Description of the Prior Art

Recently, owing to progress of computer technology, prices of optical disk drives are becoming lower. Slim optical disk drives are used for storage devices of notebook computers, and because of increasing demand for the notebook computers on the market, the demand for the slim optical disk drives is also increasing. In addition, owing to the progress of computer technology, a reading speed of the optical disk drives is becoming faster.

Conventional slim optical disk drives of the notebook computers utilize a straight-line guiding mechanism, which needs at least two tracks and corresponding guiding slots. Therefore, the conventional slim optical disk drives become more complicated and have more components and higher manufacturing cost. Additionally, the conventional slim optical disk drives have to combine the guiding structure by an upper cover and a lower cover, which are for protecting an internal mecha module, resulting in increasing dimension of the slim optical disk drives so as to occupy more space inside the notebook computers. This problem is no doubt a serious drawback in mechanical design of the notebook computers.

SUMMARY OF THE INVENTION

The present invention provides an optical disk drive with a rotary load/eject mechanism and a related computer device for solving above drawbacks.

According to the claimed invention, an optical disk drive includes a bracket, and a mecha module installed on the bracket. The mecha module includes a mounting plate fixed on the bracket, an optical pick-up head installed on the mounting plate in a slidable manner for reading or writing data in an optical disk, and a spindle motor installed on the mounting plate for rotating the optical disk. The optical disk drive further includes a rotary mechanism connected to the bracket and a base for driving the bracket to rotate into or out of an opening on a housing relative to the base.

According to the claimed invention, the rotary mechanism includes a shaft installed on the base, and a sheath disposed on the bracket and sheathing with the shaft so that the bracket rotates relative to the base. According to the claimed invention, the optical disk drive further includes a connector disposed on the bracket, and a flexible cable connected to the connector for transmitting the data read or written by the optical pick-up head. According to the claimed invention, the rotary mechanism further includes a linkage module connected to the flexible cable and the base for rotating on a plane whereon the bracket is driven relative to the base.

According to the claimed invention, the linkage module is a double-bar linkage module. According to the claimed invention, the flexible cable is fixed inside the linkage module. According to the claimed invention, the optical disk drive further includes a bezel fixed on the bracket for covering the opening when the bracket rotates into the opening of the housing relative to the base. According to the claimed invention, the rotary mechanism includes a track disposed on a bottom of the bracket, and a wall disposed on the base for guiding a rotary orbit of the track. According to the claimed invention, the track is an arc track, and the wall is an arc wall.

According to the claimed invention, a computer device includes a housing, an opening being formed on a side of the housing, a base disposed on a side of the housing, and an optical disk drive installed on the base in a rotatable manner. The optical disk drive includes a bracket, and a mecha module installed on the bracket. The mecha module includes a mounting plate fixed on the bracket, an optical pick-up head installed on the mounting plate in a slidable manner for reading or writing data in an optical disk, and a spindle motor installed on the mounting plate for rotating the optical disk. The optical disk drive further includes a rotary mechanism connected to the bracket and the base for driving the bracket to rotate into or out of the opening on the housing relative to the base.

According to the claimed invention, the optical disk drive is a slim optical disk drive.

According to the claimed invention, the computer device is a notebook computer.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
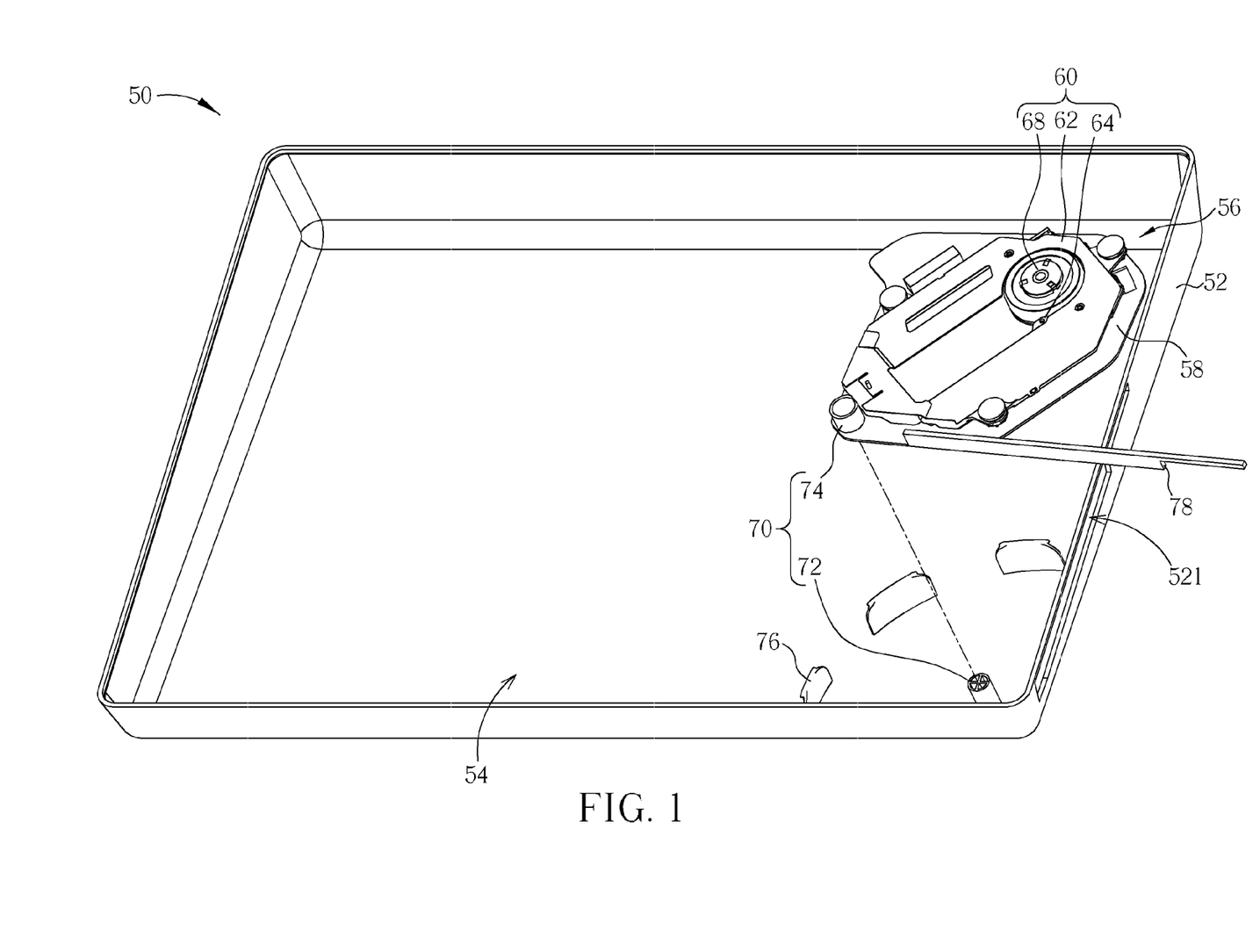
FIG. 1 is an exploded diagram of components of a computer device according to a preferred embodiment of the present invention.

Please refer to FIG. 1. FIG. 1 is an exploded diagram of components of a computer device 50 according to a preferred embodiment of the present invention. The computer device 50 can be a notebook computer, and so on. The computer device 50 includes a housing 52. An opening 521 is formed on a side of the housing 52. The computer device 50 further includes a base 54 disposed on a side of the housing 52. The base 54 can be a lower cover of the computer device 50. The housing 52 and the base 54 are for supporting and covering inner components. The computer device 50 further includes an optical disk drive 56 installed on the base 54 in a rotatable manner. The optical disk drive 56 can be a slim optical disk drive. The optical disk drive 56 includes a bracket 58 and a mecha module 60 installed on the bracket 58. The mecha module 60 includes a mounting plate 62 fixed on the bracket 58, an optical pick-up head 64 installed on the mounting plate 62 in a slidable manner for reading or writing data in an optical disk, and a spindle motor 68 installed on the mounting plate 62 for rotating the optical disk so that the optical pick-up head 64 can read or write data in an optical disk. The optical disk drive 56 further includes a rotary mechanism 70 connected to the bracket 58 and the base 54 for driving the bracket 58 to rotate into or out of the opening 521 on the housing 52 relative to the base 54. The rotary mechanism 70 includes a shaft 72 installed on the base 54, and a sheath 74 disposed on the bracket 58 and sheathing with the shaft 72 so that the bracket 58 can rotate relative to the base 54. The rotary mechanism 70 further includes at least one wall 76 disposed on the base 54. The wall 76 can be an arc wall. In addition, the optical disk drive 56 further includes a bezel 78 fixed on the bracket 58 for covering the opening 521 when the bracket 58 rotates into the opening 521 on the housing 52 relative to the base 54.

Figure 2:
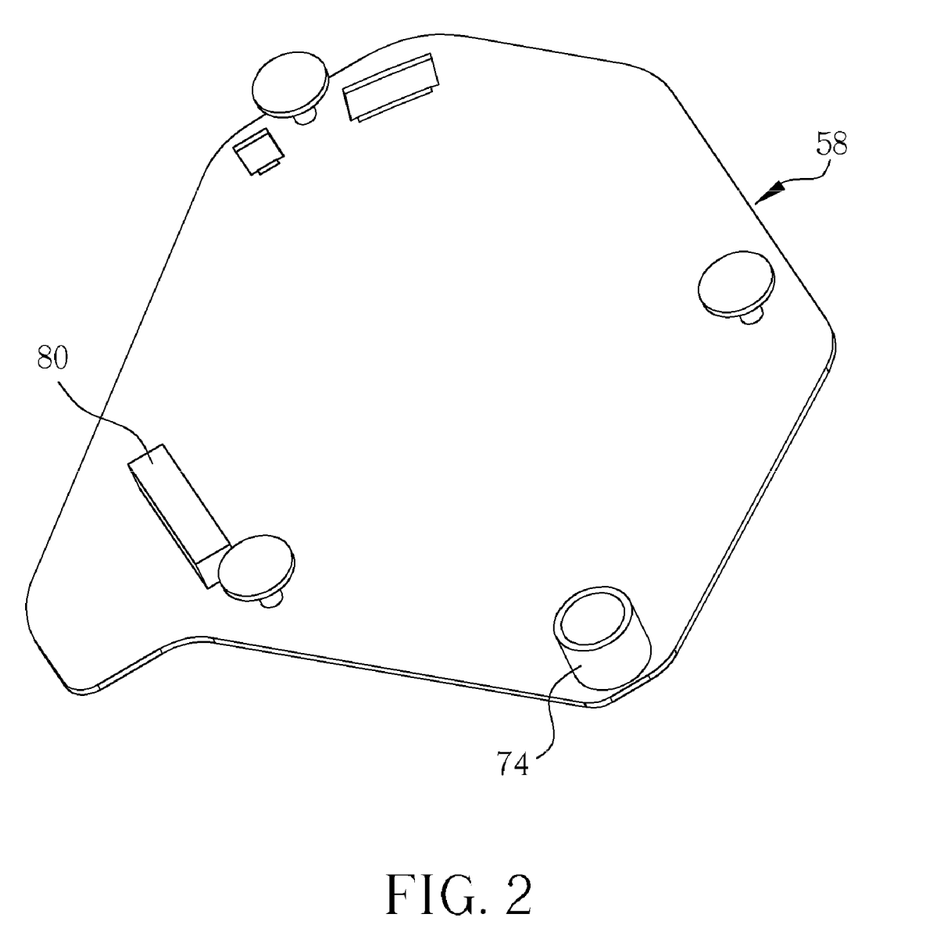
FIG. 2 and FIG. 3 are a top view and a bottom view of a bracket according to the preferred embodiment of the present invention, respectively.
Figure 3:
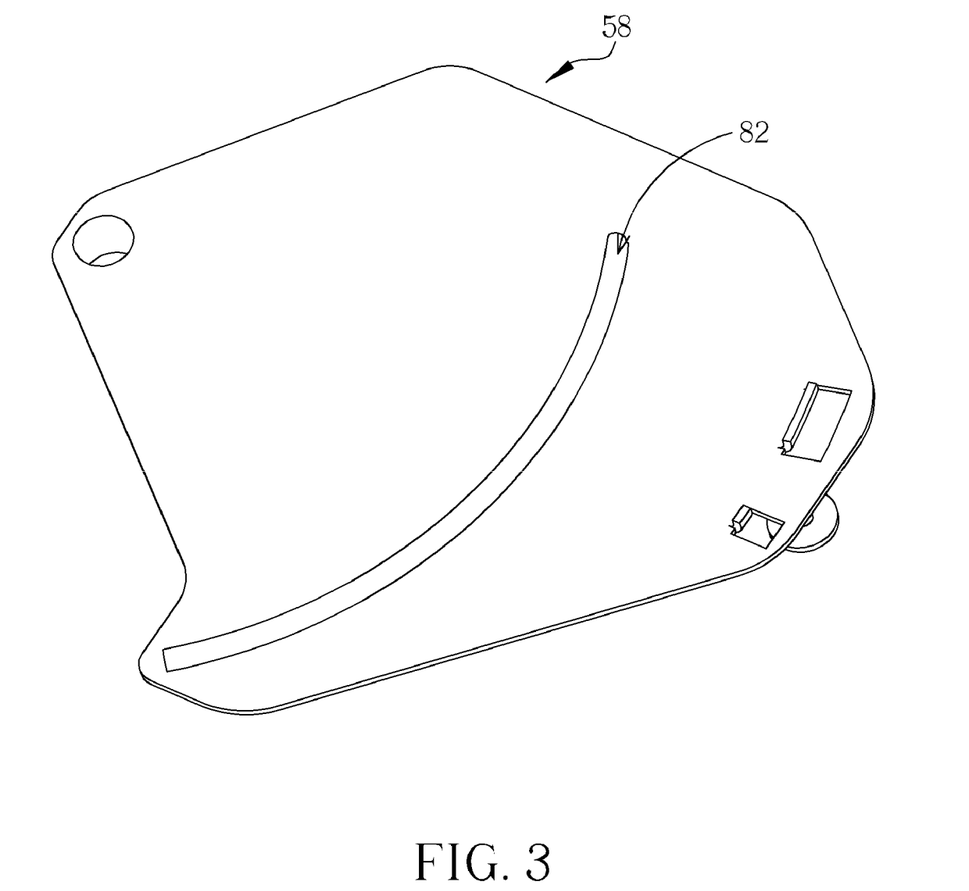
Figure 4:
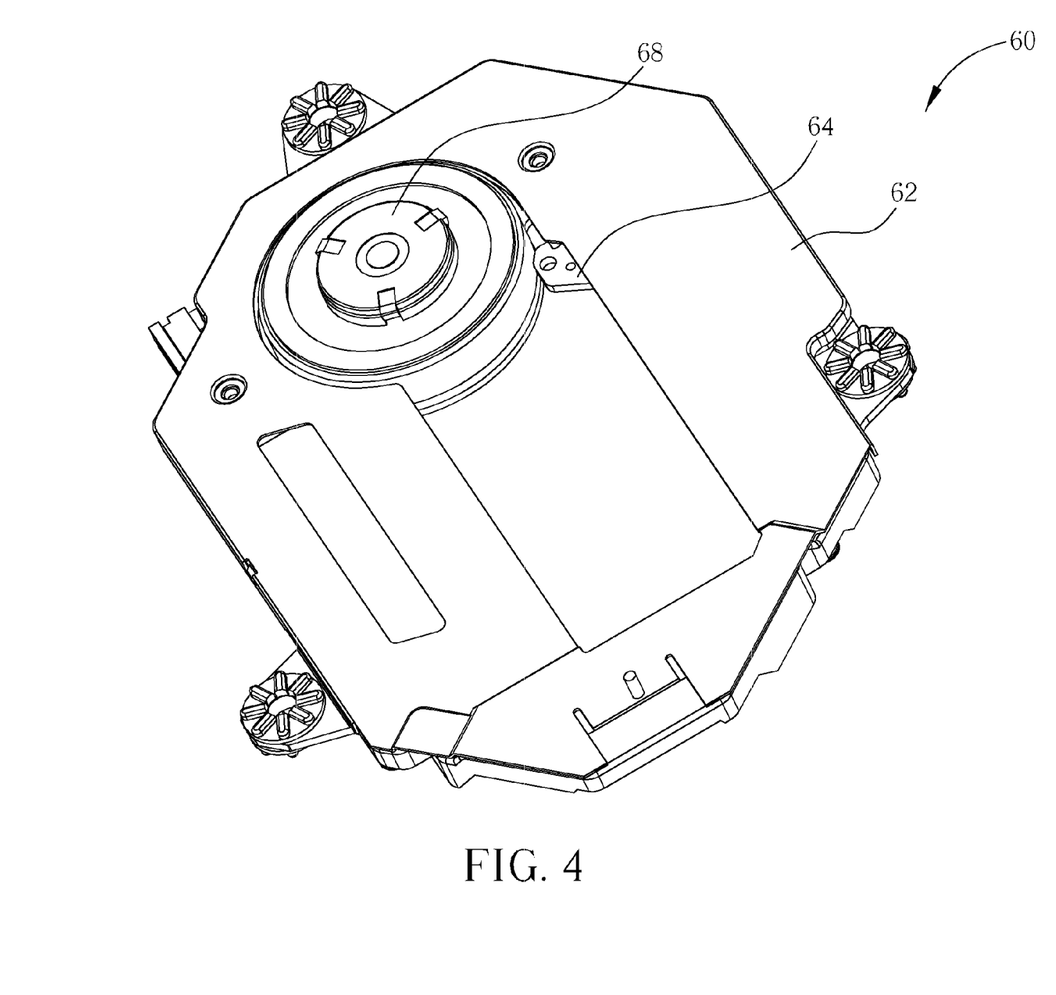
FIG. 4 and FIG. 5 are a top view and a bottom view of a mecha module according to the preferred embodiment of the present invention, respectively.
Figure 5:
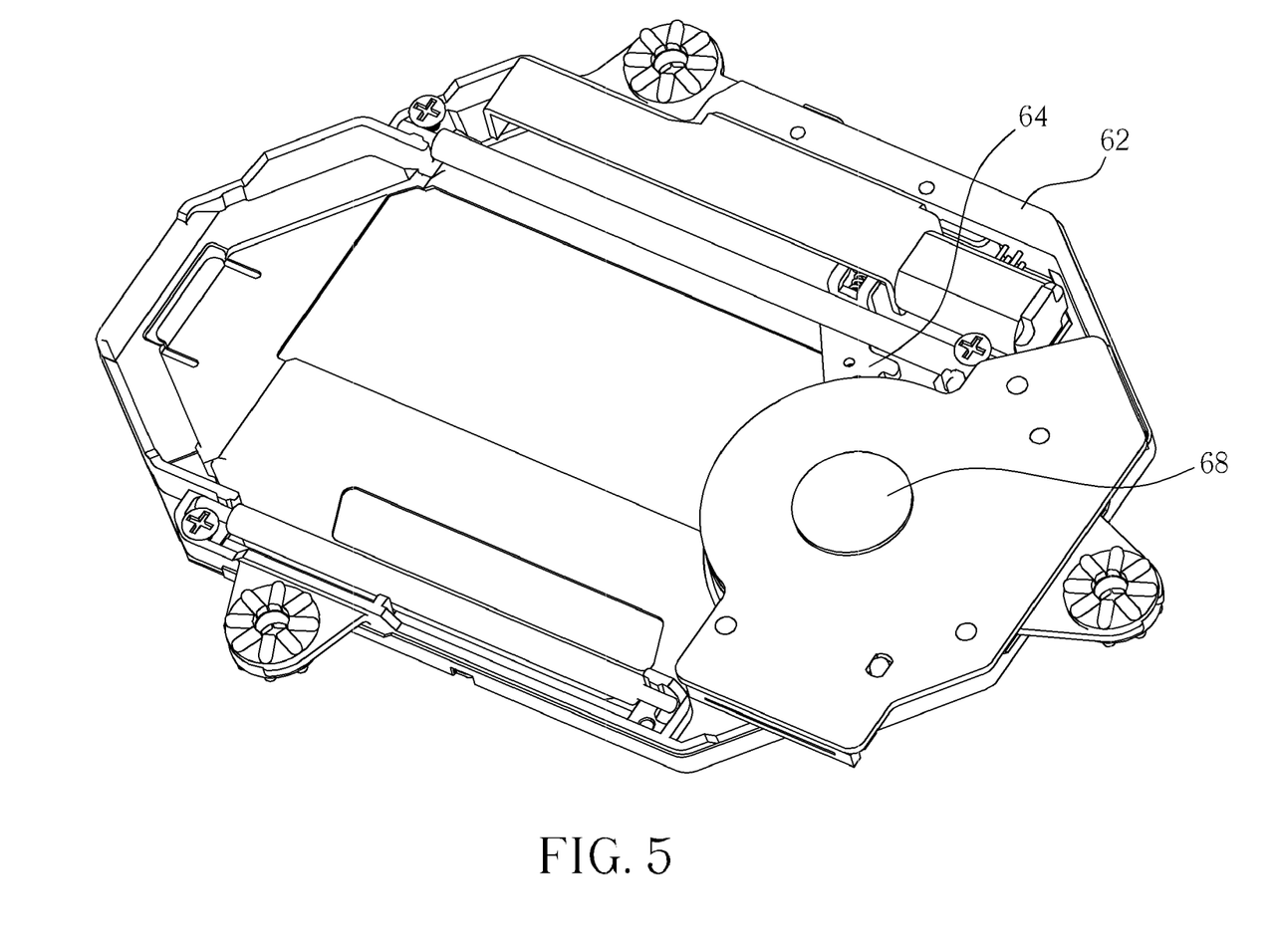

Please refer to FIG. 2 to FIG. 5. FIG. 2 and FIG. 3 are a top view and a bottom view of the bracket 58 according to the preferred embodiment of the present invention, respectively. FIG. 4 and FIG. 5 are a top view and a bottom view of the mecha module 60 according to the preferred embodiment of the present invention, respectively. The mecha module 60 can be screwed on the bracket 58, which means the mecha module 60 and the bracket 58 can be separable, or the mecha module 60 and the bracket 58 can be integrated as a single component. It depends on actual design demand. A connector 80 is disposed on a side of the bracket 58, which is for supporting the mecha module 60. The connector 80 can be electrically connected to the optical pick-up head 64, the spindle motor 68, and so on. A track 82 is formed on the other side (a bottom side) of the bracket 58 for cooperating with the wall 76. That is to say, when the bracket 58 rotates relative to the base 54, the wall 76 can guide a rotary orbit of the track 82 so as to constrain the bracket 58 to rotate in the predetermined rotary orbit.

Figure 6:
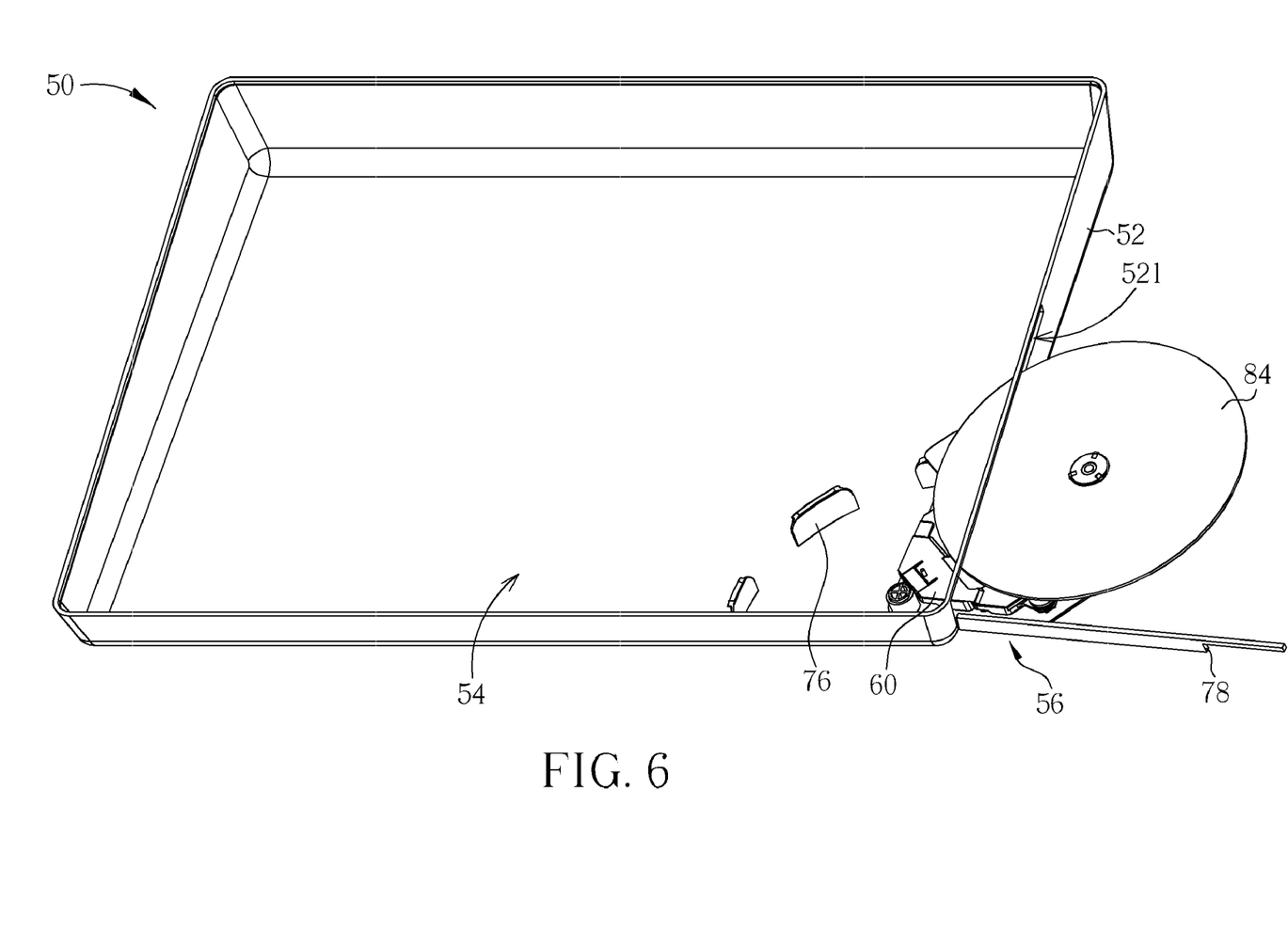
FIG. 6 is a diagram of an optical disk loaded on an optical disk drive according to the preferred embodiment of the present invention.
Figure 7:
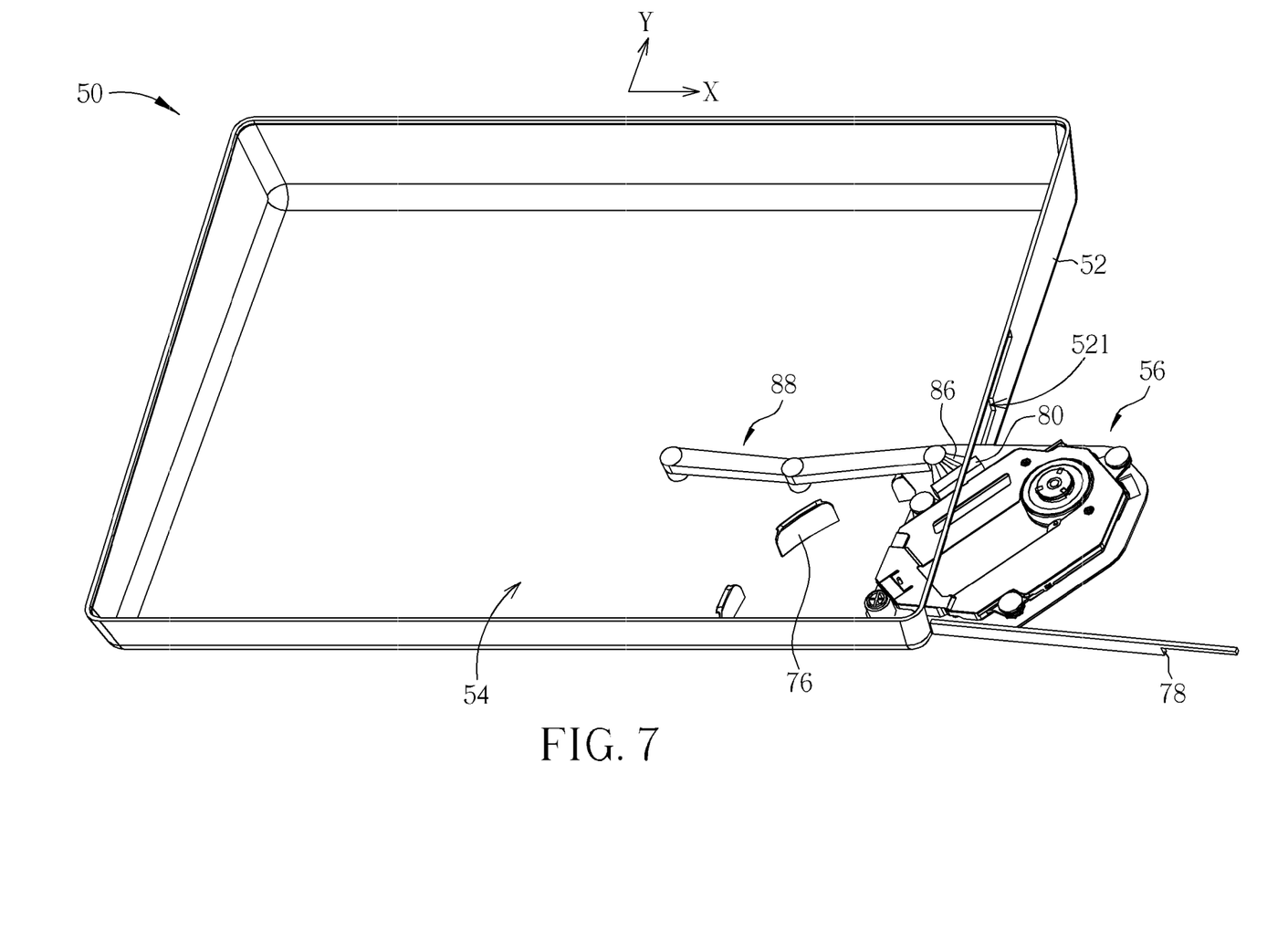
FIG. 7 and FIG. 8 are diagrams of the optical disk drive ejecting from and loading into a housing according to the preferred embodiment of the present invention, respectively.
Figure 8:
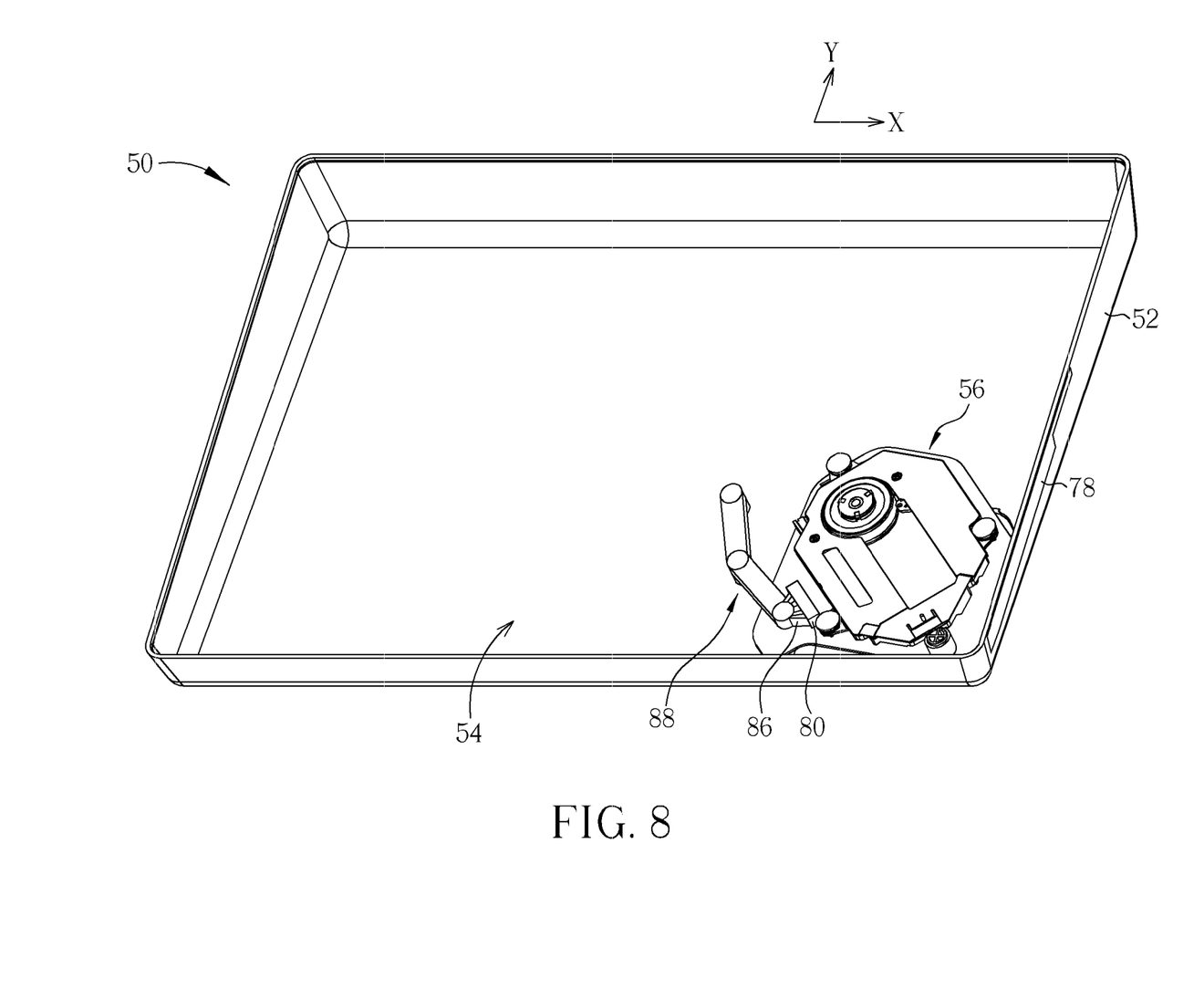

Please refer to FIG. 6. FIG. 6 is a diagram of an optical disk 84 loaded on the optical disk drive 56 according to the preferred embodiment of the present invention. The optical disk 84 is disposed on the mecha module 60. Because the mecha module 60 can rotate relative to the base 54, the optical disk 84 can be driven into or out of the opening 521 on the housing 52. Please refer to FIG. 7 and FIG. 8. FIG. 7 and FIG. 8 are diagrams of the optical disk drive 56 ejecting from and loading into the housing 52 according to the preferred embodiment of the present invention, respectively. When the optical disk drive 56 is ejected out of the housing 52, the optical disk 84 can be put on or taken off. When the optical disk drive 56 is loaded into the housing 52, the data in the optical disk 84 can be read and written by the optical disk drive 56. The optical disk drive 56 further includes a flexible cable 86 connected to the connector 80 for transmitting the data read or written by the optical pick-up head 64 or for transmitting electricity and signals of the spindle motor 68. The rotary mechanism 70 further includes a linkage module 88 connected to the flexible cable 86 and the base 54 for rotating on a plane (X-Y plane) whereon the bracket 58 is driven relative to the base 54. The linkage module 88 can be a double-bar linkage module. An end of the linkage module 88 is fixed on the base 54, and the other end of the linkage module 88 is connected to the flexible cable 86. The two bars are pivoted to each other so that the mecha module 60 can rotate relative to the base 54. In addition, the flexible cable 86 can be fixed inside the linkage module 88 and connected to a connector of a computer system. The linkage module 88 can also be a multi-bar linkage module, and it depends on actual design demand. When the bracket 58 and the mecha module 60 rotate relative to the base 54, the linkage module 88 can rotate in an stable track. Therefore, the flexible cable 86 contained in the linkage module 88 can keep in the stable track, so that the flexible cable 86 is not sprawling and not broken by a bending force accidentally.

Comparing to the prior art, the optical disk drive of the present invention installs the guiding mechanism of the optical disk drive on the base directly, such as the lower cover of the notebook computers, and changes the sliding trace from a conventional straight-line movement to a rotary movement. The external component of the notebook computer (the low cover) can be utilized as a structural component for protecting the optical disk drive, and is no need to add an upper cover and the lower cover, which are for protecting internal mecha module, to combine the guiding mechanism. Therefore, the optical disk drive of the present invention has simple structure and utilizes less components so as to reduce the manufacturing cost and the dimension of the optical disk drive and to occupy less space in the notebook computer, which corresponds to a trend of the slim optical disk drive in the notebook computer industry.

Those skilled in the art will readily observe that numerous modifications and alterations of the device and method may be made while retaining the teachings of the invention.

What is claimed is:

1. An optical disk drive comprising:
   a bracket;
   a connector disposed on the bracket;
   a mecha module installed on the bracket, the mecha module comprising:
     a mounting plate fixed on the bracket;
     an optical pick-up head installed on the mounting plate in a slidable manner for reading or writing data in an optical disk; and
     a spindle motor installed on the mounting plate for rotating the optical disk;
   a flexible cable connected to the connector for transmitting the data read or written by the optical pick-up head; and
   a rotary mechanism connected to the bracket and a base for driving the bracket to rotate into or out of an opening on a housing relative to the base, the rotary mechanism comprising a linkage module connected to the flexible cable and the base for rotating on a plane whereon the bracket is driven relative to the base, and the flexible cable being contained inside the linkage module.

2. The optical disk drive of claim 1, wherein the rotary mechanism further comprises:
   a shaft installed on the base; and
   a sheath disposed on the bracket and sheathing with the shaft so that the bracket rotates relative to the base.

3. The optical disk drive of claim 1, wherein the linkage module is a double-bar linkage module.

4. The optical disk drive of claim 1, wherein the flexible cable is fixed inside the linkage module.

5. The optical disk drive of claim 1 further comprising:
   a bezel fixed on the bracket for covering the opening when the bracket rotates into the opening of the housing relative to the base.

6. The optical disk drive of claim 1, wherein the rotary mechanism further comprises:
   a track disposed on a bottom of the bracket; and
   a wall disposed on the base for guiding a rotary orbit of the track.

7. The optical disk drive of claim 6, wherein the track is an arc track, and the wall is an arc wall.

8. A computer device comprising:
a housing, an opening being formed on a side of the housing;
a base disposed on a side of the housing; and
an optical disk drive installed on the base in a rotatable manner, the optical disk drive comprising:
   a bracket;
   a connector disposed on the bracket;
   a mecha module installed on the bracket, the mecha module comprising:
      a mounting plate fixed on the bracket;
      an optical pick-up head installed on the mounting plate in a slidable manner for reading or writing data in an optical disk; and
      a spindle motor installed on the mounting plate for rotating the optical disk;
   a flexible cable connected to the connector for transmitting the data read or written by the optical pick-up head; and
   a rotary mechanism connected to the bracket and the base for driving the bracket to rotate into or out of the opening on the housing relative to the base, the rotary mechanism comprising a linkage module connected to the flexible cable and the base for rotating on a plane whereon the bracket is driven relative to the base, and the flexible cable being contained inside the linkage module.

9. The computer device of claim 8, wherein the rotary mechanism further comprises:
   a shaft installed on the base; and
   a sheath disposed on the bracket and sheathing with the shaft so that the bracket rotates relative to the base.

10. The computer device of claim 8, wherein the linkage module is a double-bar linkage module.

11. The computer device of claim 8, wherein the flexible cable is fixed inside the linkage module.

12. The computer device of claim 8, wherein the optical disk drive further comprises a bezel fixed on the bracket for covering the opening when the bracket rotates into the opening of the housing relative to the base.

13. The computer device of claim 8, wherein the rotary mechanism further comprises:
   a track disposed on a bottom of the bracket; and
   a wall disposed on the base for guiding a rotary orbit of the track.

14. The computer device of claim 13, wherein the track is an arc track, and the wall is an arc wall.

* * * * *